United States Patent [19]
Lin et al.

[11] Patent Number: 6,011,337
[45] Date of Patent: Jan. 4, 2000

[54] DOUBLE-SIDED, NON-IRON CORE, BRUSHLESS, AXIAL MAGNETIC FIELD PERMANENT-MAGNET TYPE DC MOTOR

[76] Inventors: Shou-Mei Lin, No. 7, Alley 6, Lane 141, Fu-Hsing N. Rd., Taipei; Yu-Yen Wang, No. 56-19, Lane 269, Lin-sin E Rd., Chiayi, both of Taiwan

[21] Appl. No.: 09/175,547

[22] Filed: Oct. 20, 1998

[51] Int. Cl.[7] ................................................. H02K 21/12
[52] U.S. Cl. ........................... 310/156; 310/74; 310/103; 310/157; 310/67 A; 310/67 R; 310/268; 310/158; 310/178; 310/179; 310/191
[58] Field of Search ............................. 310/74, 103, 156, 310/157, 67 A, 67 R, 268, 158, 178, 179, 191

[56] References Cited

U.S. PATENT DOCUMENTS

| | | | |
|---|---|---|---|
| 4,394,594 | 7/1983 | Schmider et al. | 310/68 R |
| 4,922,145 | 5/1990 | Shtipelman | 310/49 R |
| 4,959,578 | 9/1990 | Varga | 310/268 |
| 5,334,898 | 8/1994 | Skybyk | 310/268 |
| 5,334,899 | 8/1994 | Skybyk | 310/268 |
| 5,396,140 | 3/1995 | Goldie et al. | 310/268 |
| 5,646,467 | 7/1997 | Floresta et al. | 310/268 |
| 5,793,137 | 8/1998 | Smith | 310/114 |

*Primary Examiner*—Nestor Ramirez
*Assistant Examiner*—Thanh Lam
*Attorney, Agent, or Firm*—Bacon & Thomas

[57] ABSTRACT

A double-sided, non-iron core, brushless, axial magnetic field permanent-magnet type DC motor includes a shaft, two electromagnet units parallelly mounted on the shaft, and a permanent magnet unit mounted on the shaft between the electromagnet units and having its direction of magnetization disposed in parallel to the shaft. The permanent magnet unit is allowed to rotate relatively around the electromagnet units by being forced by magnetic repulsion force from both sides. Electromagnetic areas at the electromagnet units are arranged in a staggered manner, enabling permanent steel magnets at the permanent magnet unit to be alternatively fully induced from its two opposite sides to provide a high torsion output. The electromagnetic areas of the two electromagnet units are caused to change the phase alternatively at a 90° phase difference, so that vibration and dead section problems are eliminated during the operation of the DC motor.

6 Claims, 6 Drawing Sheets

DOUBLE-SIDED, NON-IRON CORE, BRUSHLESS, AXIAL MAGNETIC FIELD PERMANENT-MAGNET TYPE DC MOTOR

BACKGROUND OF THE INVENTION

The present invention relates to a non-iron core, brushless, axial magnetic field permanent-magnet type DC motor, and more particularly to such a DC motor suitable for medium and low speed, high torsion and high power output operation.

A regular non-iron core, brushless, permanent-magnet type DC motors commonly have windings (coils or printed circuits) at one side, forming axial magnetic fields at one side. When a DC motor of this type is used, it is controlled by a two phase four wire type four state electronic phase control system, i.e., electric current is caused to reverse its direction at the phase difference of 180°. Because the windings induce magnetic fields only at one side, the rotor or stator receives force only from one side, causing the rotation unstable. Because electric current is caused to reverse its direction at the phase difference of 180°, the magnetic repulsion from the single-sided windings acting at one side of the permanent steel magnets utilizes only 50% of the electromaginctic fields, and the output of torsion is limited. Further, this 180° phase difference may cause the motor unable to function well at a particular angle, or cause the motor to vibrate during a low speed operation.

SUMMARY OF THE INVENTION

The present invention has been accomplished to provide a double-sided, non-iron core, brushless, axial magnetic field permanent-magnet type DC motor which eliminates the aforesaid problems. It is one object of the present invention to provide a double-sided, non-iron core, brushless, axial magnetic field permanent-magnet type DC motor which receives force evenly from both sides for a smooth operation. It is another object of the present invention to provide a double-sided, non-iron core, brushless, axial magnetic field permanent-magnet type DC motor which fully utilizes the electromagnetic fields at two opposite sides so as to provide a high torsion output. It is still another object of the present invention to provide a double-sided, non-iron core, brushless, axial magnetic field permanent-magnet type DC motor which eliminates vibration and dead section problems. According to one aspect of the present invention, the double-sided, non-iron core, brushless, axial magnetic field permanent-magnet type DC motor comprises a shaft, a first electromagnet unit and a second electromagnet unit in parallel to each other mounted around the shaft, and a permanent magnet unit mounted around the shaft in parallel to the first electromagnet unit and the second electromagnet unit. The permanent magnet unit is allowed to rotate relatively around the first electromagnet unit and the second electromagnet unit, and comprises a plurality of permanent steel magnets equiangularly spaced around the shaft and having their direction of magnetization disposed in parallel to the shaft. Each two adjacent permanent steel magnets of the permanent magnet unit are arranged in reversed magnetic directions. The first electromagnet unit and the second electromagnet unit are respectively mounted around the shaft at two opposite sides of the permanent magnet unit, and stopped from relative movement. First electromagnetic areas and second electromagnetic areas are respectively provided at the first electromagnet unit and the second electromagnet unit. The number of the first electromagnetic areas and the number of the second electromagnetic areas is equal to the number of the permanent steel magnets at the permanent magnet unit. Each two adjacent first electromagnetic areas, or each two adjacent second electromagnetic areas, have reversed directions of magnetization, that are alternatively changed. The first electromagnetic areas and the second electromagnetic areas are arranged in a staggered manner. The phase difference between the first electromagnetic areas and the second electromagnetic areas is 90°. Because the permanent magnet unit is evenly forced by magnetic repulsion force from the electromagnet units at two opposite sides, the rotation of the permanent magnet unit is more stable. Because the electromagnetic areas of the electromagnet units are arranged in a staggered manner, the electromagnetic fields caused by the electromagnetic areas are fully utilized to achieve a high torsion output. Because the phase difference between the first electromagnetic areas and the second electromagnetic areas is 90°, vibration and dead section problems are eliminated during the operation of the motor. According to another aspect of the present invention, the shaft is mounted with at least one bearing, which supports the permanent magnet revolvably on the shaft, and at least one bushing which supports the first electromagnet unit and the second electromagnet unit fixedly on the shaft, therefore the permanent magnet unit can be turned about the shaft relative to the electromagnet units. According to one another aspect of the present invention, the shaft is mounted with at least one bushing, which supports the permanent magnet fixedly on the shaft, and at least one bearing which supports the first electromagnet unit and the second electromagnet unit revolvably on the shaft. Therefore the two electromagnet units can be turned about the shaft relative to the permanent magnet unit. According to still another aspect of the present invention, the permanent magnet unit and the electromagnet units can be shaped like a disk. The permanent magnets at the permanent magnet unit and the electromagnetic areas at the electromagnet units can have an odd number, or an even number. Magnetically conductive steel covers may be respectively covered on the electromagnetic units at an outer side opposite to the permanent magnet unit. The permanent steel magnets can be adhered to or embedded or molded in the permanent magnet unit and equiangularly spaced around the center of the permanent magnet unit. Preferably, the permanent magnet unit is made by: preparing steel elements which are not magnetized in a mold, then molding a covering on each steel element that is obtained from aluminum alloy, engineering plastics, BMC, DMC, thermosetting plastics or any suitable material that is not magnetically conductive, and then magnetizing the molded elements after surface treatment. The electromagnetic areas at the electromagnet units can be coil wildings, printed circuit or equivalent elements. When installed, the windings are sealed with electrically insulative, water proof, acid and alkaline proof material to prevent a displacement during the operation of the motor.

FIGS. from 5 through 8 are sectional views from PP section, explaining the operation of the first embodiment of the present invention.

Figure 9:
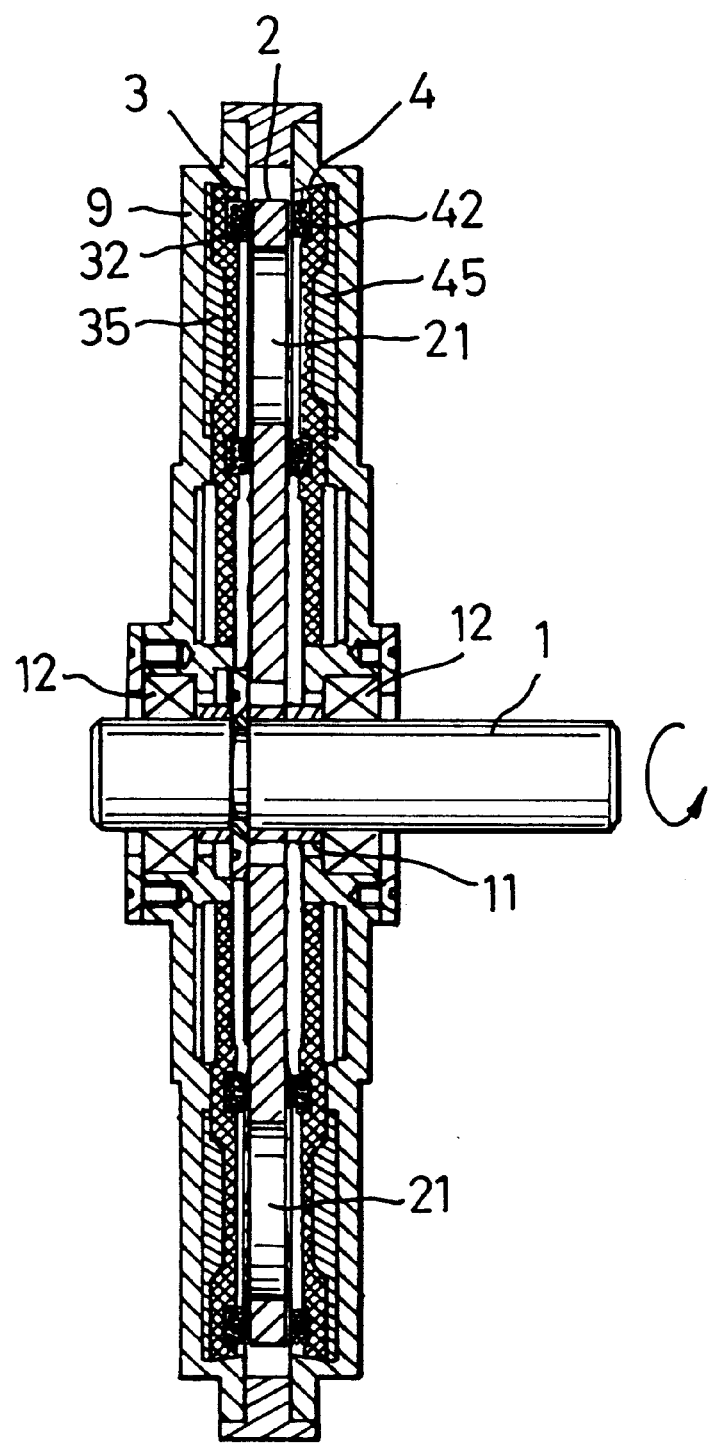

FIG. 9 is a sectional view of a DC motor according to a second embodiment of the present invention.

DETAILED DESCRIPTION OF THE PREFERRED EMBODIMENT

Figure 1:
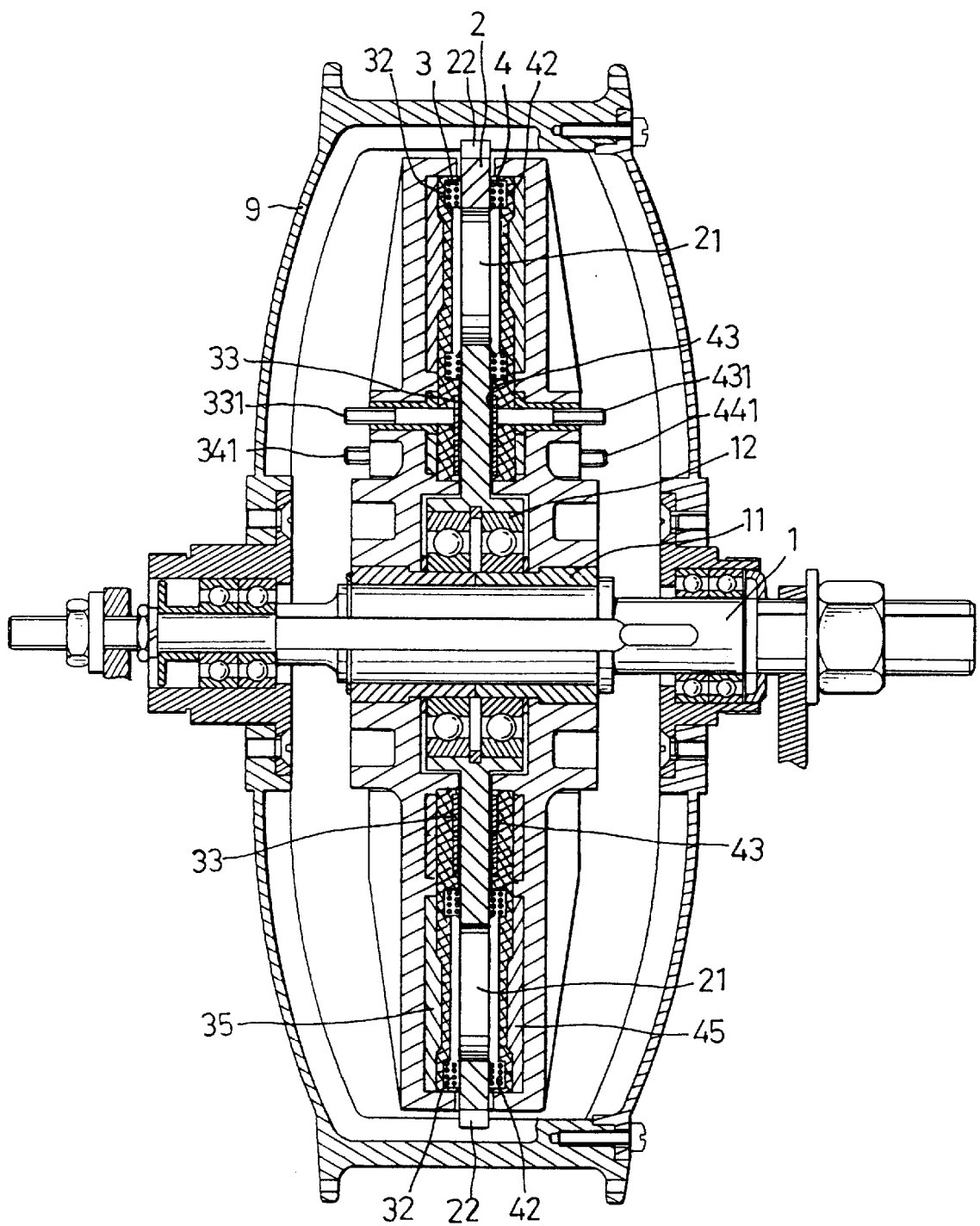
FIG. 1 is a sectional view of a DC motor according to a first embodiment of the present invention.
Figure 2:
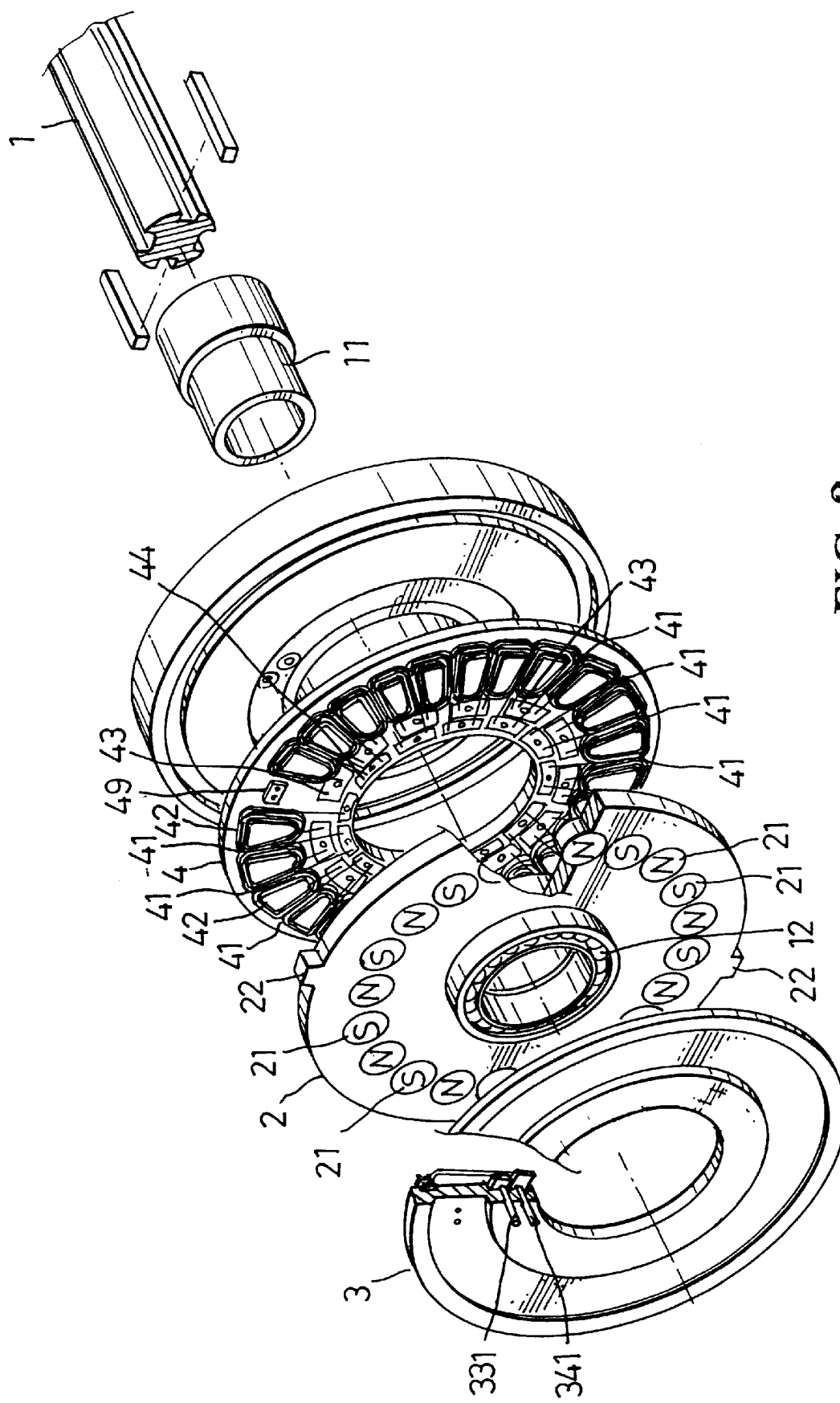
FIG. 2 is an exploded view of the first embodiment of the present invention.

Referring to FIGS. 1 and 2, a DC motor in accordance with a first embodiment of the present invention comprises a standing shaft 1, two bushings 11 and two axial bearings 12 mounted on the shaft 1. A first electromagnet unit 3, a permanent magnet unit 2 and a second electromagnet unit 4 are mounted on the shaft 1 in proper order and in parallel to each other. The electromagnet units 3,4 and the permanent magnet unit 2 are respectively shaped like a disk. The permanent magnet unit 2 is mounted on the bearings 12, having peripheral mounting blocks 22 fixedly fastened to a shell 9. Therefore the shell 9 can be rotated with the permanent magnet unit 2 around the shaft 1. The shell 9 can be for example the wheel hub of a motor-driven bicycle. The permanent magnet unit 2 comprises 24 permanent steel magnets 21 equiangularly spaced around and equally spaced from its center. Each two adjacent permanent steel magnets 21 are arranged in reversed magnetic directions. Magnetically conductive steel covers 35,45 are respectively covered on the first electromagnetic unit 3 and the second electromagnetic unit 4 at an outer side, and then the electromagnetic units 3,4 with the respective steel covers 35,45 are respectively fixedly mounted on the bushings 11 around the shaft 1 at two opposite sides of the permanent magnet unit 2. When assembled, the first electromagnet unit 3 and the second electromagnet unit 4 cannot be moved relative to each other, and the permanent magnet unit 2 can be rotated around the shaft 1 relative to the electromagnet units 3,4.

The electromagnet units 3,4 are disposed at two opposite sides of the permanent magnet unit 2, each having 24 areas. One area of the electromagnet unit 3 or 4 is mounted with a sensor (Hole sensor) 39 or 49. The other 23 areas of the electromagnet unit 3 or 4 are respectively mounted with a coil winding 32 or 42, forming first electromagnetic areas 31 or second electromagnetic areas 41.

Figure 3:
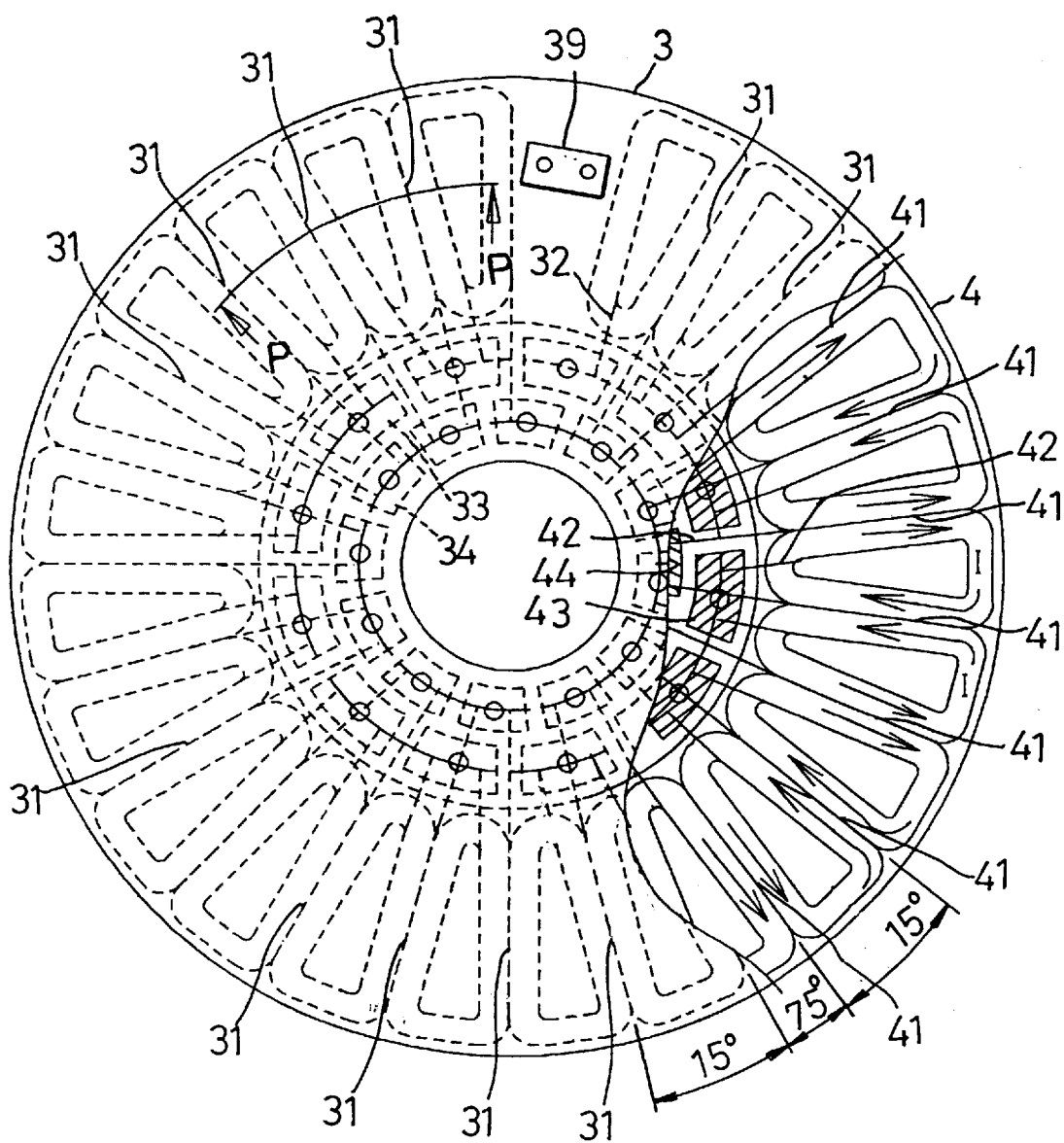
FIG. 3 illustrates the relationship between the first electromagnet unit and the second electromagnet unit according to the first embodiment of the present invention.

Referring to FIG. 3 and FIGS. 1 and 2 again, the coil windings 32,42 are respectively winded on the electromagnet units 3,4 at an inner side and sealed with electrically insulative material, and opposite ends of the coil windings 32,42 are respectively connected to plate electrodes 33,34;43,44 at different radial locations, so that power supply can be guided to the coil windings 32,42 through power terminals 331,341;431,441. The direction of electric current at each two adjacent second electromagnetic areas 41 is reversed, therefore the magnetic induction direction is reversed at each two adjacent second electromagnetic areas 41. Further, electric current reverses its direction at regular intervals controlled by the sensor 49 when passing through the second electromagnetic areas 41. The coil windings 32 at the first electromagnetic areas 31 work in same manner.

FIG. 3 also shows the relative relationship between the first electromagnet unit 3 and the second electromagnet unit 4. In FIG. 3, the permanent magnet unit 2 is not shown. As illustrates, the first electromagnetic areas 31 and the second electromagnetic areas 41 are arranged in a staggered manner, i.e., the first electromagnetic areas 31 arc respectively aimed at the spaces between each two adjacent second electromagnetic areas 41. According to the present embodiment, the pitch between each two adjacent second electromagnetic areas 41 is 15° (360°÷24=15°), and each first electromagnetic area 31 is aimed at the midpoint between each two adjacent second electromagnetic areas 41, i.e., the first electromagnetic areas 31 are respectively spaced from the second electromagnetic areas 41 at 7.5°.

Figure 4:
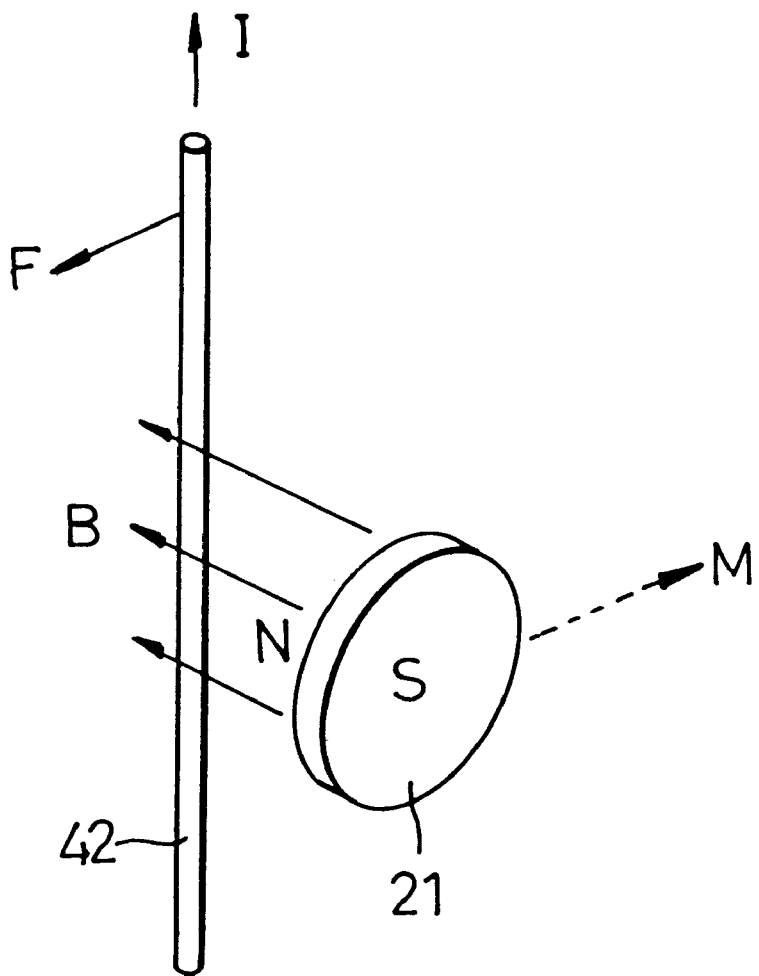
FIG. 4 is a schematic drawing explaining the left-hand rule for motor.

The operation principle of the present invention is the basic "left-hand rule" as shown in FIG. 4. If electric current I in one coil winding 42 moves upwards, the coil winding 42 receives a force F due to the effect of the magnetic field B of the permanent magnet 21. Because the coil windings 32,42 are respectively fixedly mounted on the first electromagnet unit 3 and the second electromagnetic unit 4 are maintained immovable relative to the shaft 1, the permanent steel magnets 21 are forced by the reactive force from the force F to move in direction M.

Figure 5:
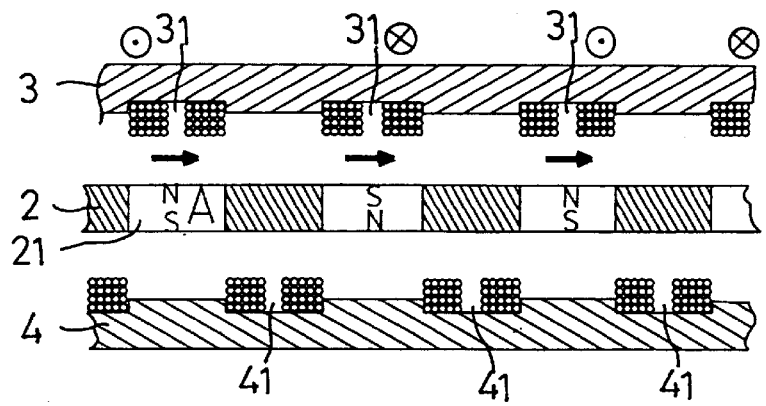
Figure 6:
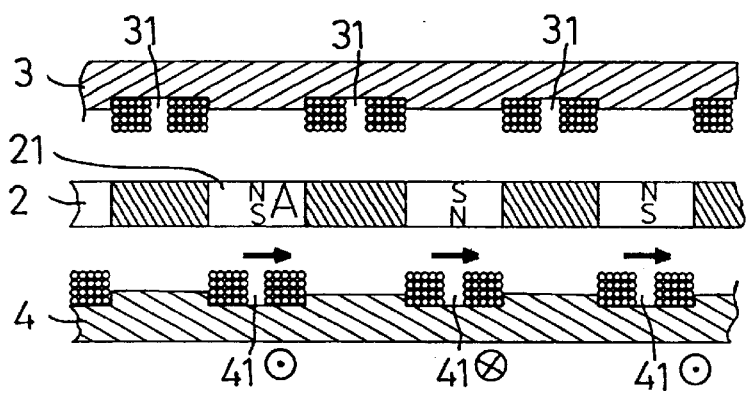
Figure 7:
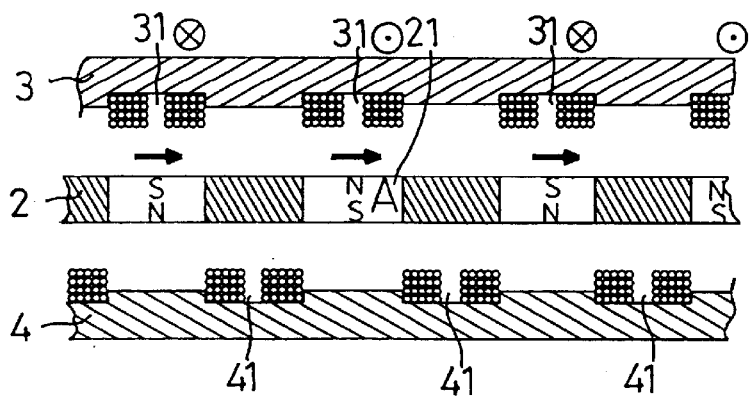
Figure 8:
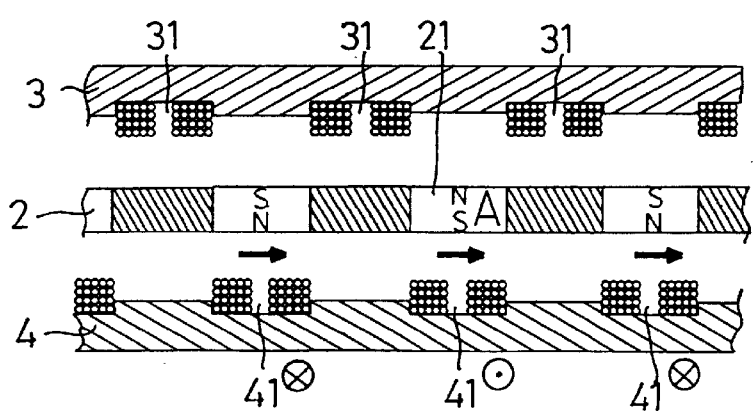

FIGS. from 5 through 8 explain the operation of the present invention, in which the sign ⊙ indicates the direction of electric current I toward the viewer, the sign X̂ indicates the direction of electric current I reversed to the viewer. In FIG. 5, the permanent magnet 21 which is numbered by A is in the first position with its N pole aimed at one first electromagnetic area 31 above, where electric current I moves in direction toward the viewer, therefore the permanent magnet 21 is forced to move rightwards subject to left-hand rule. When moved to the second position shown in FIG. 6, the S pole of the permanent magnet 21 numbered by A is aimed at one second electromagnetic area 41 below, where electric current I moves in direction toward the viewer, therefore the permanent magnet 21 is continuously forced to move rightwards subject to left-hand rule. When the permanent magnet 21 which is numbered by A is moved to the third position shown in FIG. 7, the corresponding first electromagnetic area 31 is controlled by a control signal from the sensor 39 to change the phase, and electric current I passes through the first electromagnetic area 31 in direction toward the viewer, therefore the permanent magnet 21 which is numbered by A is continuously forced to move rightwards subject to left-hand rule. When the permanent magnet 21 which is numbered by A is moved to the fourth position shown in FIG. 8, the corresponding second electromagnetic area 41 is controlled by a control signal from the sensor 49 to change the phase, and electric current I passes through the second electromagnetic area 41 in direction toward the viewer, therefore the permanent magnet 21 which is numbered by A is continuously forced to move rightwards subject left-hand rule. When the permanent magnet 21 which is numbered by A is moved to a next position, the corresponding first electromagnetic area 31 is controlled by the sensor 39 to change the phase again, causing the permanent magnet 21 to be continuously forced rightwards. These steps are repeated again and again. The phase difference of the first electromagnetic areas 31 or the second electromagnetic areas 41 is 180°, however the phase difference between the first electromagnetic areas 31 and the second electromagnetic areas 41 is 90°, therefore the permanent steel magnets 21 of the permanent magnet unit 2 can be continuously turned.

Because the first electromagnet unit 3 and the second electromagnet unit 4 are provided at two opposite sides of the permanent magnet unit 2, the permanent magnet unit 2 receives repulsion force evenly from both sides, and the permanent magnet unit 2 can be rotated smoothly. Because the first electromagnetic areas 31 and the second electromagnetic areas 41 are arranged in a staggered manner, the permanent magnet unit 2 can be alternatively fully induced by the coil windings on the electromagnetic areas 31,41 at both sides, and a high torsion output is achieved. Further, because the first electromagnetic areas 31 and the second electromagnetic areas 41 are caused to change the phase alternatively at a 90° phase difference, vibration and dead section problems are eliminated during the operation of the motor.

FIG. 9 shows an alternate form of the present invention. According to this alternate form, the permanent magnet unit 2 is fixedly mounted on the bushings 1, and the first electromagnet unit 3 and second electromagnet unit 4 are respectively mounted on the bearings 12 at two opposite sides of the permanent magnet unit 2. Therefore, the permanent magnet unit 2 can be rotated with the shaft 1 relative to the electromagnet units 3,4. This design is the so-called "axial-shaft rotary motor".

What the invention claimed is:

1. A double-sided, non-iron core, brushless, axial magnetic field permanent-magnet type DC motor, comprising a shaft, a first electromagnet unit and a second electromagnet unit in parallel to each other mounted around said shaft, and a permanent magnet unit mounted around said shaft in parallel to said first electromagnet unit and said second electromagnet unit, wherein: said permanent magnet unit is allowed to rotate around said first electromagnet unit and said second electromagnet unit, comprising a plurality of permanent steel magnets equiangularly spaced around the center thereof and having their direction of magnetization disposed in parallel to said shaft, each two adjacent permanent steel magnets of said permanent magnet unit being arranged in reversed magnetic directions; said first electromagnet unit and said second electromagnet unit are respectively mounted around said shaft at two opposite sides of said permanent magnet unit and stopped from relative movement; first electromagnetic areas and second electromagnetic areas are respectively provided at said first electromagnet unit and said second electromagnet unit, the number of said first electromagnetic areas and the number of said second electromagnetic areas being equal to the number of said permanent steel magnets at said permanent magnet unit, each two adjacent first electromagnetic areas having reversed direction of magnetization and being alternatively changed, each two adjacent second electromagnetic areas having reversed direction of magnetization and being alternatively changed, said first electromagnetic areas and said second electromagnetic areas being arranged in a staggered manner, the phase difference between said first electromagnetic areas and said second electromagnetic areas being 90°.

2. The double-sided, non-iron core, brushless, axial magnetic field permanent-magnet type DC motor of claim 1 wherein said shaft is mounted with at least one bearing, which supports said permanent magnet revolvably on said shaft, and at least one bushing which supports said first electromagnet unit and said second electromagnet unit fixedly on said shaft.

3. The double-sided, non-iron core, brushless, axial magnetic field permanent-magnet type DC motor of claim 1 wherein said shaft is mounted with at least one bushing, which supports said permanent magnet fixedly on said shaft, and at least one bearing which supports said first electromagnet unit and said second electromagnet unit revolvably on said shaft.

4. The double-sided, non-iron core, brushless, axial magnetic field permanent-magnet type DC motor of claim 1 wherein said first electromagnetic areas and said second electromagnetic areas each are comprised of a coil.

5. The double-sided, non-iron core, brushless, axial magnetic field permanent-magnet type DC motor of claim 1 wherein said first electromagnetic areas and said second electromagnetic areas each are comprised of a printed circuit.

6. The double-sided, non-iron core, brushless, axial magnetic field permanent-magnet type DC motor of claim 1 wherein said permanent magnet unit, said first electromagnet unit and said second electromagnet unit each have a disk-like shape.

* * * * *